US008229621B2

(12) United States Patent
Kim

(10) Patent No.: US 8,229,621 B2
(45) Date of Patent: Jul. 24, 2012

(54) METHOD OF STORING ACCIDENT DATA FOR A VEHICLE

(75) Inventor: Hyun Chul Kim, Seoul (KR)

(73) Assignee: PLK Technologies Co., Ltd., Seoul (KR)

( * ) Notice: Subject to any disclaimer, the term of this patent is extended or adjusted under 35 U.S.C. 154(b) by 365 days.

(21) Appl. No.: 12/664,647

(22) PCT Filed: Jun. 2, 2008

(86) PCT No.: PCT/KR2008/003079

§ 371 (c)(1), (2), (4) Date: Dec. 14, 2009

(87) PCT Pub. No.: WO2008/156252

PCT Pub. Date: Dec. 24, 2008

(65) Prior Publication Data

US 2010/0174449 A1 Jul. 8, 2010

(30) Foreign Application Priority Data

Jun. 21, 2007 (KR) ........................ 10-2007-0060859

(51) Int. Cl.
*G01M 17/00* (2006.01)

(52) U.S. Cl. ...................................... 701/32.2; 701/33.4

(58) Field of Classification Search ................. 701/32.2, 701/33.4

See application file for complete search history.

(56) References Cited

U.S. PATENT DOCUMENTS 6,629,030 B2 * 9/2003 Klausner et al. ............. 701/32.2

FOREIGN PATENT DOCUMENTS

| | | |
|---|---|---|
| KR | 1019960017498 | 10/1998 |
| KR | 1019960019019 | 10/1998 |
| KR | 1019960081394 | 3/1999 |
| KR | 1019980013940 | 3/2001 |
| KR | 1020000031631 | 12/2001 |
| KR | 2020020009098 | 2/2002 |
| KR | 1020010016954 | 10/2002 |
| KR | 1020010034885 | 12/2002 |
| KR | 1020020019854 | 10/2003 |

OTHER PUBLICATIONS

PCT/KR2008/003079, Korean Intellectual Property Office, International Search Report, Oct. 23, 2008.

* cited by examiner

*Primary Examiner* — Eric Culbreth

(74) *Attorney, Agent, or Firm* — Stephen C. Beuerle; Procopio Cory Hargreaves & Savitch LLP

(57) ABSTRACT

Provided is a method of storing accident data for a vehicle, in which image data taken by a camera during driving is stored in real time, a weight value is set according to a measured impulse value to calculate a priority index and data is stored in a memory based on the priority index, thereby preventing initial accident-cause data from being deleted over time. The method includes acquiring driving data including image data, setting a weight value corresponding to an average impulse value and calculating a priority index, selecting a block having a lowest priority index and storing the driving data in the selected block if the capacity of the volatile memory is full, determining whether a timer starts, and reading out all data stored in the volatile memory and storing the read data in the non-volatile memory if the predetermined amount of time has elapsed.

4 Claims, 3 Drawing Sheets

[Fig. 1]
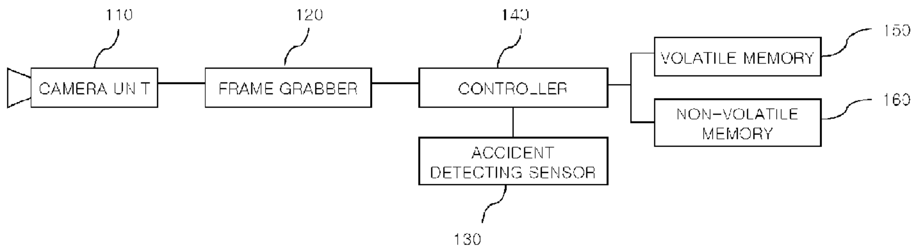
[Fig. 2]
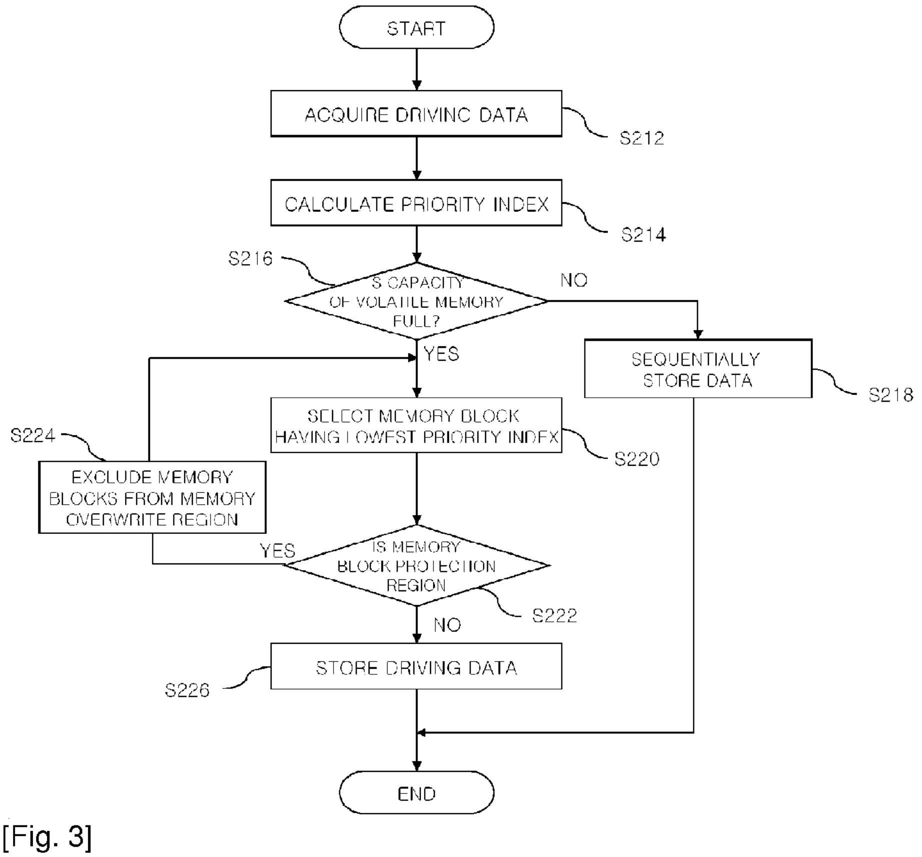
[Fig. 3]
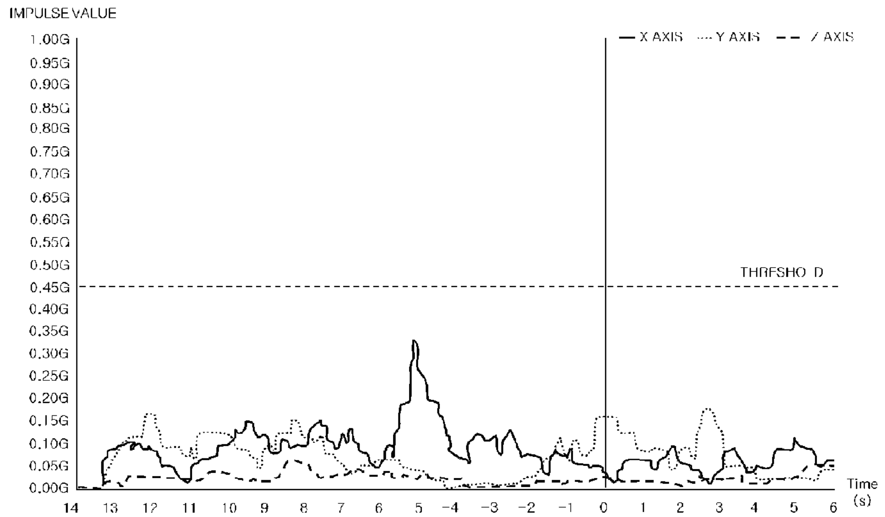

[Fig. 4]
| MEMORY BLOCK | PRIORITY INDEX |
|---|---|
| 1 | 0.80 |
| 2 | 0.40 |
| 3 | 0.20 |
| 4 | 0.10 |
| 5 | 0.00 |
| 6 | 0.10 |
| 7 | 0.50 |
| 8 | 0.80 |
| 9 | 0.60 |
| 10 | 1.75 |
| 11 | 1.20 |
| 12 | 0.60 |
| 13 | 1.00 |
| 14 | 1.50 |
| 15 | 2.40 |
| 16 | 1.85 |
| 17 | 1.20 |
| 18 | 1.70 |
| 19 | 0.13 |
| 20 | 0.10 |
| MEMORY BLOCK | PRIORITY INDEX |
|---|---|
| 1 | 0.80 |
| 2 | 0.40 |
| 3 | 0.20 |
| 4 | 0.10 |
| 5 | 0.12 |
| 6 | 0.10 |
| 7 | 0.50 |
| 8 | 0.80 |
| 9 | 0.60 |
| 10 | 1.75 |
| 11 | 1.20 |
| 12 | 0.60 |
| 13 | 1.00 |
| 14 | 1.50 |
| 15 | 2.40 |
| 16 | 1.85 |
| 17 | 1.20 |
| 18 | 1.70 |
| 19 | 0.13 |
| 20 | 0.10 |
[Fig. 5]
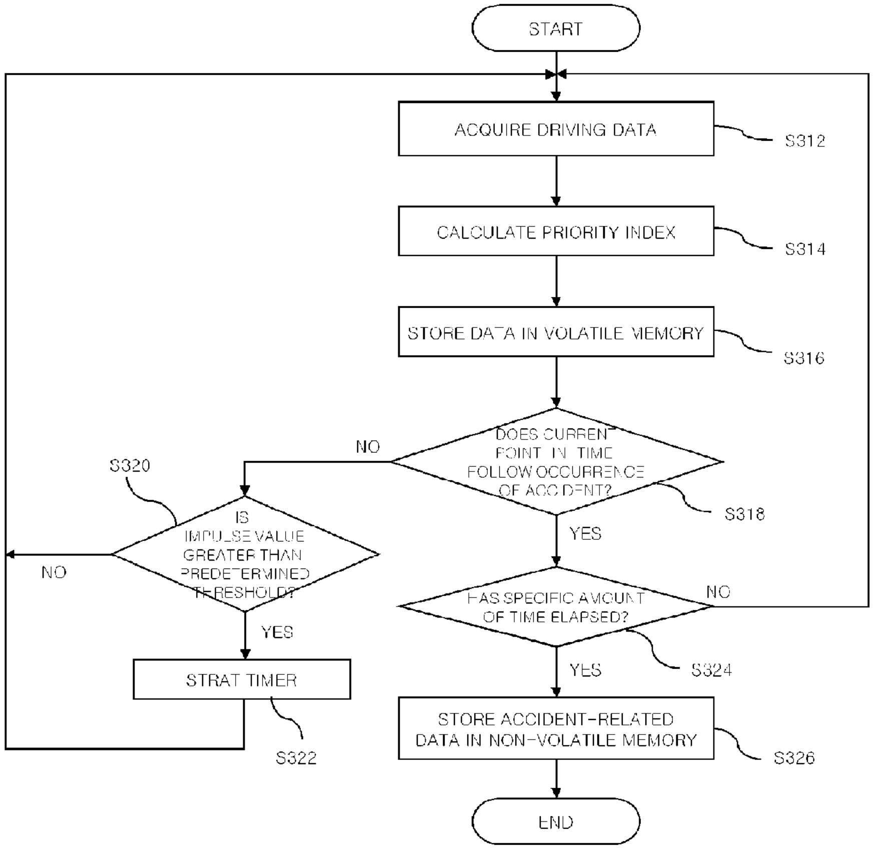

[Fig. 6]
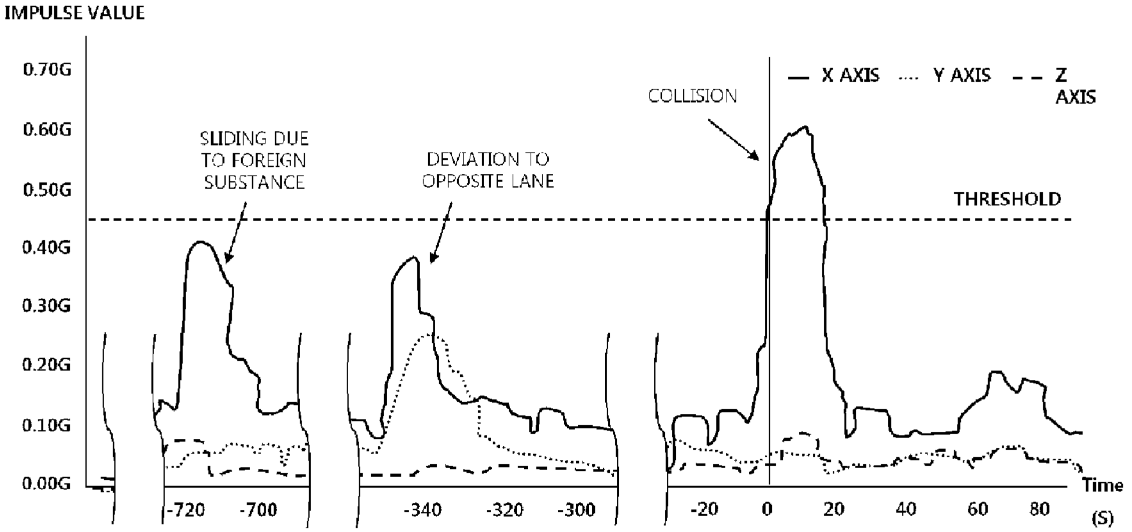
<USING FIFO MNNER>
| | MEMORY BLOCK |
|---|---|
| 1 | -280S ~ -261S |
| 2 | -260S ~ -241S |
| 3 | -240S ~ -221S |
| 4 | -220S ~ -201S |
| 5 | -200S ~ -181S |
| 6 | -180S ~ -161S |
| . | . |
| 15 | 0S ~ 20S ← COLLISION |
| 16 | 21S ~ 40S |
| 17 | 41S ~ 60S |
| 18 | 61S ~ 80S |
| 19 | 81S ~ 100S |
| 20 | 101S ~ 120S |
<USING PRIORITY INDEX>
| | MEMORY BLOCK | PRIORITY INDEX | |
|---|---|---|---|
| 1 | -720S ~ -701S | 2.10 | ← SLIDING |
| 2 | -700S ~ -681S | 0.60 | |
| 3 | -680S ~ -661S | 0.40 | |
| 4 | -360S ~ -341S | 2.80 | ← DEVIATION TO OPPOSITE LANE |
| 5 | -340S ~ -321S | 0.18 | |
| 6 | -320S ~ -301S | 0.14 | |
| . | . | . | |
| 15 | 0S ~ 20S | THRESHOLD | ← COLLISION |
| 16 | 21S ~ 40S | THRESHOLD | |
| 17 | 41S ~ 60S | THRESHOLD | |
| 18 | 61S ~ 80S | THRESHOLD | |
| 19 | 81S ~ 100S | THRESHOLD | |
| 20 | 101S ~ 120S | THRESHOLD | |

METHOD OF STORING ACCIDENT DATA FOR A VEHICLE

TECHNICAL FIELD

The present invention generally relates to a method of storing accident data for a vehicle, and more particularly, to a method of storing accident data for a vehicle, in which when image data taken by a camera during driving is stored in real time, a weight value is set according to a measured impulse value to calculate a priority index and data is stored in a memory based on the priority index, thereby preventing initial accident-cause data from being deleted over time.

BACKGROUND ART

Recently, to acquire data for determining circumstances at the time of a vehicle accident and a fault between parties, research and development on a vehicle black box for recording driving data such as vehicle speed have been conducted actively. In particular, a vehicle accident data recording apparatus has recently attracted much attention, which records external circumstances at the time of an accident as image data by using a camera mounted in the vehicle and uses pre- and post-accident external image data as well as driving data, thereby finding out cause of the accident. The accident of the vehicle means an unexpected event which may cause damage to a body of the vehicle or of a passenger, including not only small and large collisions between vehicles but also collisions between a pedestrian and a vehicle, collusions between an obstacle and a vehicle, and damage to vehicles during driving on a road construction zone having a dug road surface.

As such a conventional vehicle accident data recording apparatus, a vehicle driving recording apparatus and method is disclosed in Korean Patent Registration No. 0199792. The disclosed vehicle driving recording apparatus records image data collected by a camera during driving of a vehicle in a recording/reproduction unit, together with vehicle speed and time data, in a First In First Out (FIFO) structure, sensing a collision accident of the vehicle with a sensor, and stopping a recording operation and at the same time, holding data being input several minutes before the accident, thereby allowing recorded data to be used as corroborative facts for the accident.

However, the conventional vehicle accident data recording apparatus stores data in an FIFO manner and deletes the oldest data corresponding to an excess over capacity upon generation of new data, in which way the occurrence of a traffic accident is recognized and cause of the traffic accident is analyzed based on only data being stored before and after the accident.

As such, the conventional vehicle accident data recording apparatus determines a point-in-time at which the accident occurs by merely sensing impulse caused by a collision of the vehicle and analyzes cause of the accident only with limited data recorded before and after the point-in-time of the accident. As a result, data associated with initial cause leading to a large-scale accident, such as a minor collision between the vehicle and a bicycle, a motorcycle, a vehicle, or a person, or wheel missing or a slight shock accident, is deleted over time, making it difficult to find out initial cause of an accident, which is one of important clues for investigating the accident.

DISCLOSURE OF INVENTION

Technical Problem

The present invention is conceived to solve the aforementioned problems of a conventional vehicle accident data recording method. In other words, an object of the present invention is to provide a method of storing accident data for a vehicle, in which when image data taken by a camera during driving is stored in real time, a weight value is set according to a measured impulse value to calculate a priority index and data is stored in a memory based on the priority index, thereby preventing initial accident-cause data from being deleted over time.

Technical Solution

The present invention based on a technical spirit for achieving the object provides a method of storing accident data for a vehicle implemented in an apparatus for storing accident data for a vehicle, the apparatus including a camera unit, a frame grabber, an accident detecting sensor, a volatile memory, a non-volatile memory, and a controller. The method includes acquiring, by the controller, driving data including image data every predetermined interval, setting a weight value corresponding to an average impulse value included in the acquired driving data, and calculating a priority index, sequentially storing the driving data if a capacity of the volatile memory is not full, and selecting a block having a lowest priority index from the volatile memory and storing the driving data in the selected block if the capacity of the volatile memory is full, determining, by the controller, whether a timer starts, checking if an impulse value acquired in real time is greater than a predetermined threshold if the timer does not start, and starting the timer if the impulse value is greater than the predetermined threshold, if the timer starts, determining whether a predetermined amount of time has elapsed from a point-in-time at which the timer starts, and reading out all data stored in the volatile memory and storing the read data in the non-volatile memory as accident-related data if the predetermined amount of time has elapsed from the point-in-time at which the timer starts.

Advantageous Effects

In the method of storing accident data for a vehicle according to the present invention, when image data taken by a camera during driving is stored in real time, a weight value is set according to a measured impulse value to calculate a priority index and data is stored in a memory based on the priority index, thereby preventing initial accident-cause data from being deleted over time and judging liability for the accident through clearly investigation of driving circumstances at the time of the accident.

Moreover, according to the present invention, a point-in-time at which the accident occurs can be more accurately detected, thereby providing accident-related data for coping with various accident circumstances including a minor collision or a collision with a pedestrian.

BRIEF DESCRIPTION OF THE DRAWINGS

FIG. 1 is a block diagram of an apparatus for storing accident data for a vehicle, to which the present invention is applied;

FIG. 2 is a flowchart illustrating a volatile memory management process according to the present invention;

FIG. 3 is a graph of impulse values obtained in a data interval stored in a single memory block according to an embodiment of the present invention;

FIG. 4 illustrates volatile memory blocks stored in accordance with priority indices according to an embodiment of the present invention;

FIG. 5 is a flowchart illustrating a method of storing accident data for a vehicle, to which the volatile memory management process illustrated in FIG. 2 is applied; and FIG. 6 illustrates a non-volatile memory in which data is stored by using the method of storing accident data for a vehicle according to an embodiment of the present invention.

EXPLANATION OF REFERENCE NUMERALS FOR MAIN PORTIONS IN DRAWINGS

110: Camera unit
120: Frame grabber
130: Accident detecting sensor
140: Controller
150: Volatile memory
160: Non-volatile memory

BEST MODE FOR CARRYING OUT THE INVENTION

Hereinafter, a preferred embodiment of the present invention will be described in detail with reference to the accompanying drawings.

FIG. 1 is a block diagram of an apparatus for storing accident data for a vehicle, to which the present invention is applied.

The apparatus to which the present invention is applied includes a camera unit 110 which is an image taking means, a frame grabber 120 which obtains digital image data from an image taken by the camera unit 110, an accident detecting sensor 130 which detects a shock of a vehicle and outputs the detection result while being mounted in place in the vehicle, a volatile memory 150 which temporarily stores data, a non-volatile memory 160 which stores accident-related data in case of the occurrence of an accident, and a controller 140 which controls each component and processes input signals, including an image signal, to store driving data in the volatile memory 150 and the non-volatile memory 160.

The camera unit 110, being at least one camera comprised of a Complementary Metal Oxide Semiconductor (CMOS) or Charge Coupled Device (CCD) image sensor or an InfraRed (IR) camera, is mounted in place in a vehicle in order to take an image. The camera unit 110 is mounted preferably on a front windshield glass of the vehicle, and more preferably on an upper portion or a lower portion of the front windshield glass of the vehicle in order not to obstruct a driver's field of vision. The camera unit 110 may also be provided in the rear side of the vehicle or at both lateral sides of the vehicle as well as the front side of the vehicle in order to take an external image from an individual direction.

The frame grabber 120 inputs therein an analog image signal taken by the camera unit 110 and converts the input analog image signal into a digital image signal having preset frame-per-second and resolution. The output digital image signal may have a frame-per-second and a resolution that allow analysis of accident circumstances, and preferably a frame-per-second of 7 ?10 and a resolution of 320×240 pixels.

The accident detecting sensor 130 detects impulse generated by driving of a vehicle and converts the detected impulse into an electric signal. The accident detecting sensor 130 uses a semiconductor device capable of measuring an impulse value from all directions of a three-dimensional space, such as an acceleration sensor. The impulse value is calculated as a maximum change of acceleration per unit time.

The volatile memory 150 stores various data, transmitted by the controller 140, by a predetermined amount. In the present invention, the stored data may include image data, an impulse value, a weight value, a priority index, a position of an accident obtained by using a Global Positioning System (GPS), and time data such as an estimated point-in-time at which the accident occurs (at which a shock is detected) and each data collecting or storing point-in-time.

The volatile memory 150 stores the data on the basis of a priority index calculated by the controller 140, and operates in such a way that data having a lowest priority index is deleted for an excess over the capacity caused by storage of new data. However, in the event of the occurrence of an accident, a specific amount of data recorded before and after a point-in-time at which the accident occurs should not be deleted. Thus, the volatile memory 150 performs tag recording or includes a separate storing region for accident-related data in order to safely hold the accident-related data.

At the time of the accident, the non-volatile memory 160 reads out all the data stored in the volatile memory 150 according to a command of the controller 140 and permanently stores the read data in order to provide material for later analyzing a cause of the accident.

A Universal Serial Bus (USB) output terminal (not shown) may be connected to the non-volatile memory 160 in order to allow driving data recorded before and after the point-in-time at which the accident occurs, the driving data being stored in the non-volatile memory 160, to be reproduced on a Personal Computer (PC) after the occurrence of the accident. In other words, the USB output terminal and the PC are connected through a USB cable and an accident data reproduction program installed in the PC is executed to reproduce image data and driving data recorded before and after the point-in-time at which the accident occurs, the image data and the driving data being stored in a data storage means, thereby allowing close analysis of a cause of the accident.

The controller 140 controls components of the apparatus for storing accident data for a vehicle. If the impulse value being output from the accident detecting sensor 130 exceeds a predetermined threshold, the controller 140 determines that an accident occurs and reads out all data stored in the volatile memory 150 to permanently store the read data in the non-volatile memory 160.

The controller 140 also calculates a priority index by applying a weight value to acquired data according to the impulse value and manages the volatile memory 150 on the basis of the calculated priority index. Hereinafter, a volatile memory management process on the basis of the priority index will be described in detail with reference to FIG. 2.

FIG. 2 is a flowchart illustrating the volatile memory management process according to the present invention.

First, in operation S212, the controller 140 acquires driving data by sampling, every predetermined interval, image data acquired by the camera unit 110 and the frame grabber 120 and vehicle accident-related signals such as an impulse value, a vehicle speed, time, etc., acquired by the accident detecting sensor 130. In the present invention, it is assumed that the predetermined interval is set to 1 second, there are 20 volatile memory blocks, and a data interval stored in a single memory block is 20 seconds.

In operation S214, a priority index is calculated based on a weight value being set with respect to a corresponding range of the impulse value included in the acquired driving data. The weight value is a constant value which is set based on an average of impulse values acquired in a data interval stored in a single memory block, and the priority index is calculated by multiplying the average of the impulse values by the weight value. Examples of weight values being set based on impulse values are shown in the following table.

TABLE

| Impulse value | Weight value |
|---|---|
| Below 0.10 G | 0 |
| More than 0.01 G-Below 0.15 G | 1 |
| More than 0.15 G-Below 0.20 G | 2 |
| More than 0.20 G-Below 0.25 G | 3 |
| More than 0.25 G-Below 0.30 G | 4 |
| More than 0.30 G-Below 0.35 G | 5 |
| More than 0.35 G-Below 0.40 G | 6 |
| More than 0.40 G-Below 0.45 G | 7 |
| More than 0.45 G | Threshold region |

For example, if an average of impulse values acquired in a data interval stored in a single memory block is below 0.10 G, a weight value is set to 0. A weight value is set to 1 for an average of more than 0.01 G to 0.15 G, and a weight value is set to 2 for an average of more than 0.15 G to 0.2 G. A priority index is calculated by multiplying the set weight value by the average of impulse values acquired in a data interval stored in a corresponding memory block. Referring to FIG. 3, impulse values with respect to x, y, and z axes, generated for 20 seconds, which is a data interval stored in a single memory block, are summed up and the summation result is divided by a product of time and the number of axes (20 seconds×3 axes=60), thereby obtaining an average impulse value of about 0.12 G. Thus, a weight value is set to 1 according to Table 1, and a priority index is 0.12 by multiplying the average impulse value of 0.12 G by the weight value of 1.

Next, it is determined whether the capacity of the volatile memory 150 is full in operation S216, and if the volatile memory 150 is not full, data and a priority index are sequentially stored in the memory in operation S218. However, if the capacity of the volatile memory 150 is full, a priority index for each memory block is checked to select a memory block having a lowest priority index and the data and the priority index are stored in the selected memory block in operation S226.

However, in case of the occurrence of an accident, a specific amount of data recorded before and after the point-in-time at which the accident occurs should not be deleted. Thus, a memory block which stores data before a predetermined time from the current point-in-time, and a memory block which stores data recorded after the point-in-time at which the accident occurs are set as protection regions to exclude the memory blocks from a memory overwrite region, thereby allowing the specific amount of data recorded before and after the point-in-time at which the accident occurs to be safely held regardless of the priority index in operations S222 to S224.

For example, when the average impulse value included in the acquired driving data is 0.12 G and the weight value is set to 1, based on which the priority index is calculated as 0.12, as illustrated in FIG. 3, and when the capacity of a volatile memory block is full, the controller 140 selects a 5th memory block having a lowest priority index as illustrated in FIG. 4. Next, the controller 140 checks if the 5th memory block is a protection region recorded before the predetermined time from the current point-in-time or a protection region storing driving data recorded after the point-in-time at which the accident occurs. If the 5th memory block is not either protection region, the controller 140 stores the acquired driving data in the 5th memory block.

Thus, memory blocks are managed based on their priority indices in such a way that a memory block having a lowest priority index is deleted first if the capacity of the volatile memory 150 is full, thereby preventing important data corresponding to an initial cause of an accident from being deleted. Alternatively, the volatile memory 150 may be managed by calculating a priority index only with an impulse value working in a forward/backward direction or a right/left direction, acquired with respect to 2 axes or 1 axis.

FIG. 5 is a flowchart illustrating a method of storing accident data for a vehicle, to which the volatile memory management process illustrated in FIG. 2 is applied.

First, the controller 140 acquires driving data by sampling, every predetermined interval, image data acquired by the camera unit 110 and the frame grabber 120 and vehicle accident-related signals such as an impulse value, a vehicle speed, time, etc., acquired by the accident detecting sensor 130 in operation S312. The controller 140 sets a weight value according to an average impulse value included in the acquired driving data to calculate a priority index in operation S314, and stores data in the volatile memory 150 based on the calculated priority index in operation S316. As mentioned above, a method for storing the data on the basis of the calculated priority index is implemented in such a way that the driving data is sequentially stored if the capacity of the volatile memory 150 is not full, and a volatile memory block having a lowest priority index is selected to store the data if the capacity of the volatile memory 150 is full.

The controller 140 checks if a timer starts in order to determine whether the current point-in-time follows the occurrence of the accident in operation S318. Herein, the timer starts in a timer driving stage to be described later.

If the current point-in-time precedes the occurrence of the accident where the timer does not start, the controller 140 checks if an impulse value is greater than a pre-determined threshold in order to determine whether the accident occurs in operation S320. If the impulse value is greater than the predetermined threshold, the controller 140 determines that the accident occurs and starts the timer in operation S322 and returns to operation S312 to acquire driving data.

If the current point-in-time follows the occurrence of the accident where the timer starts, the controller 140 determines whether a specific amount of time has elapsed from a point-in-time at which the accident occurs in operation S324. If the specific amount of time has not yet elapsed, the controller 140 goes back to operation S312 to acquire driving data. In contrast thereto, if the specific amount of time has elapsed, the controller 140 reads out all image data and driving data stored in the volatile memory 150 to store the read data in the non-volatile memory 160 as accident-related data in operation S326, thereby completing the entire signal processing procedure.

FIG. 6 illustrates the non-volatile memory 160 in which data is stored by using the method of storing accident data for a vehicle according to an embodiment of the present invention.

For example, it is assumed that a vehicle deviates to the opposite lane by sliding due to a foreign substance on the road during traveling and thus collides with a vehicle approaching from the opposite direction on the same lane. If an impulse value of the vehicle sliding due to the foreign substance is 0.40 G which is below a threshold, and the amount of time elapsed from a point-in-time at which this accident occurs exceeds a predetermined time stored in the memory, accident-related data stored in the non-volatile memory 160 using a conventional FIFO manner corresponds to only data recorded before and after the point-in-time at which the collision with the approaching vehicle occurs.

However, although the impulse value at a point-in-time at which the vehicle slides due to the foreign substance does not exceed the threshold, it is certainly greater than an impulse value acquired during normal traveling. Therefore, in the non-volatile memory 160 based on a priority index according to the present invention, a weight value set by an impulse value and a priority index calculated based on the weight value and the impulse value are relatively high.

Accordingly, as illustrated in FIG. 6, data regarding trivial causes of the accident, i.e., sliding due to the foreign substance and deviation to the opposite lane, remains without being deleted over time, thereby making it easy to analyze an initial cause of a large-scale accident and to determine circumstances at the time of the accident and a fault between parties.

The present invention is not limited by the foregoing embodiment and the attached drawings, and it will be apparent to those of ordinary skill in the art that various substitutions, alterations, and/or modifications may be made to the disclosed embodiment without departing from the spirit and scope of the present invention.

Industrial Applicability

By actually using the method according to the present invention, it is possible to reduce confliction regarding liability for a vehicle accident by clearly investigating a point-in-time at which the accident occurs and driving circumstances at the time of the accident, and also to provide objective data regarding various accidents including a minor collision or a collision with a pedestrian.

The invention claimed is:

1. A method of storing accident data for a vehicle implemented in an apparatus for storing accident data for a vehicle, the apparatus including a camera unit, a frame grabber, an accident detecting sensor, a volatile memory, a non-volatile memory, and a controller, the method comprising:

acquiring, by the controller, driving data including image data every pre-determined interval;

setting a weight value corresponding to an average impulse value included in the acquired driving data, and calculating a priority index;

sequentially storing the driving data if a capacity of the volatile memory is not full, and selecting a block having a lowest priority index from the volatile memory and storing the driving data in the selected block if the capacity of the volatile memory is full;

determining, by the controller, whether a timer starts, checking if an impulse value acquired in real time is greater than a predetermined threshold if the timer does not start, and starting the timer if the impulse value is greater than the pre-determined threshold;

if the timer starts, determining whether a predetermined amount of time has elapsed from a point-in-time at which the timer starts; and reading out all data stored in the volatile memory and storing the read data in the non-volatile memory as accident-related data if the predetermined amount of time has elapsed from the point-in-time at which the timer starts.

2. The method of claim 1, wherein the average impulse value is an average of impulse values acquired in a data interval stored in a single memory block with respect to at least one 1 axis.

3. The method of claim 1, wherein the priority index is calculated by multiplying the average impulse value by the weight value being set corresponding to the average impulse value.

4. The method of claim 1, wherein the selecting of the block having the lowest priority index and the storing of the driving data in the selected block comprises:

setting a memory block which stores data recorded before a specific amount of time from a current point-in-time and a memory block which stores data recorded after a point-in-time at which the accident occurs as a memory overwrite region, thereby allowing a specific amount of data recorded before and after the point-in-time at which the accident occurs to be safely held regardless of the priority index.

* * * * *